United States Patent [19]

Ozawa

[11] Patent Number: 4,497,305
[45] Date of Patent: Feb. 5, 1985

[54] COLD-START BOOSTING DEVICE OF AUTOMOTIVE ENGINE

[75] Inventor: Masuo Ozawa, Tokyo, Japan

[73] Assignee: Nissan Motor Company, Limited, Yokohama, Japan

[21] Appl. No.: 549,749

[22] Filed: Nov. 8, 1983

[30] Foreign Application Priority Data

Dec. 1, 1982 [JP] Japan .................. 57-209297

[51] Int. Cl.³ .......................... F02M 31/00
[52] U.S. Cl. ..................... 123/556; 123/553
[58] Field of Search ............ 123/556, 553, 142.5 E, 123/142.5 R, 552

[56] References Cited

U.S. PATENT DOCUMENTS

| | | | |
|---|---|---|---|
| 3,872,839 | 3/1975 | Russell | 123/556 |
| 3,939,813 | 2/1976 | Harrow | 123/553 |
| 3,957,024 | 5/1976 | Mills | 123/553 |
| 3,965,681 | 6/1976 | Wyczalek | 123/553 |
| 3,987,773 | 10/1976 | Harrow | 123/553 |
| 4,365,606 | 12/1982 | Endo | 123/556 |
| 4,365,607 | 12/1982 | Ishikawa | 123/556 |

OTHER PUBLICATIONS

"*Internal Combustion Engine*", Mar., 1978, Sankai do.

Primary Examiner—Ronald H. Lazarus
Attorney, Agent, or Firm—Leydig, Voit, Osann, Mayer and Holt, Ltd.

[57] ABSTRACT

Herein disclosed is an improved cold-start boosting device of an automotive engine, which comprises a heat pipe having a heat absorbing end exposed to the vehicle cabin and a heat emitting end exposed to the interior of a passage through which air flows before entering the engine proper, and a portable electric regenerator which is detachably connectable to the heat absorbing end of the heat pipe.

11 Claims, 4 Drawing Figures

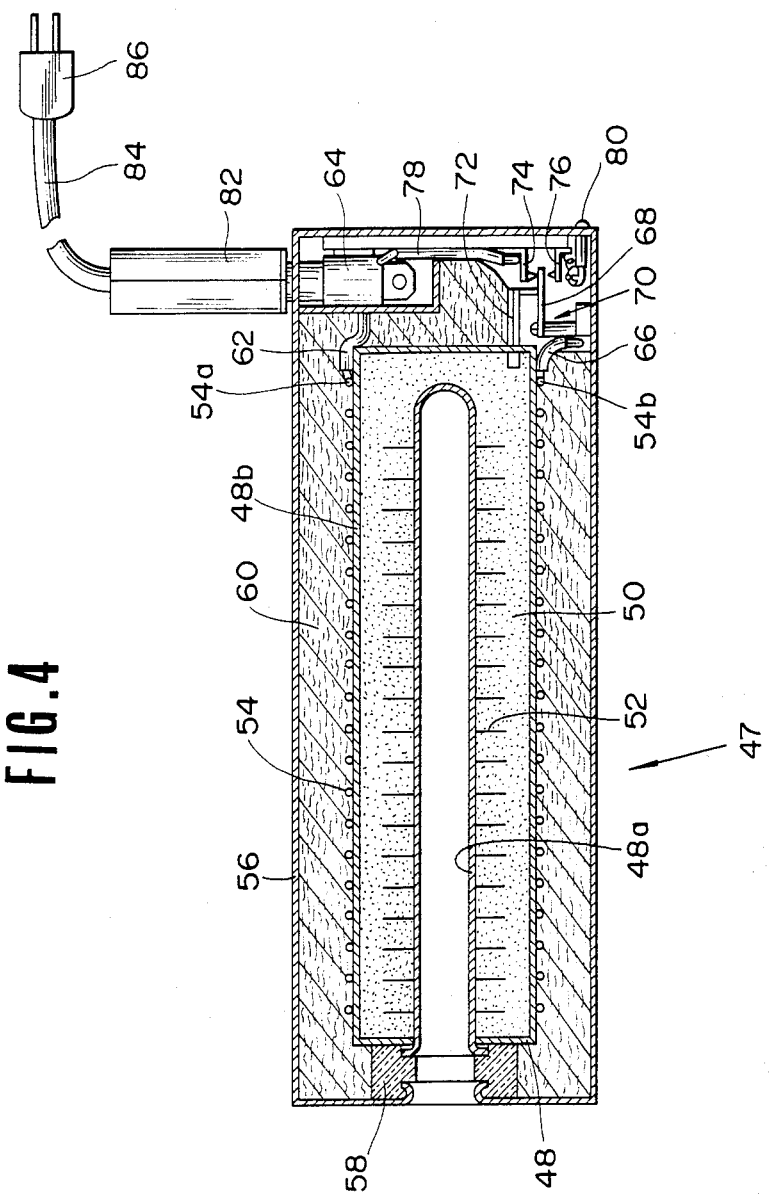

COLD-START BOOSTING DEVICE OF AUTOMOTIVE ENGINE

BACKGROUND OF THE INVENTION

1. Field of the Invention

The present invention relates to a cold-start boosting device of an automotive engine, which can facilitate starting of the engine even under a cold condition.

2. Description of the Prior Art

In order to facilitate starting of an automotive engine under a cold condition, there has been proposed various "cold-start boosting devices". Many of them are of a type of keeping the engine proper warmed by extra energy, such as electric power, until the engine starting is carried practically out. However, due to the inherent construction thereof, some of them have drawbacks, for example, they are difficult to handle and expensive to operate. These drawbacks will be outlined hereinafter.

SUMMARY OF THE INVENTION

According to the present invention, there is provided a cold-start boosting device of an automotive engine, which can be conveniently and economically handled.

According to the present invention, there is provided a cold-start boosting device of an automotive engine, the device comprising a heat pipe having a heat absorbing end exposed to the vehicle cabin and a heat emitting end exposed to the interior of a passage through which intake air flows before entering the engine proper, and a portable thermal storage device which is detachably connectable to the heat absorbing end of the heat pipe thereby to transmit heat accumulated in the thermal storage device to the intake air through the heat pipe.

BRIEF DESCRIPTION OF THE DRAWINGS

Objects and advantages of the present invention will become apparent from the following description when taken in conjunction with the accompanying drawings, in which:

FIG. 4 is a sectional view of a portable thermal storage device which is usable in the device of the present invention.

BRIEF DESCRIPTION OF A CONVENTIONAL DEVICE

Prior to describing the detail of the present invention, one conventional cold-start boosting device will be briefly described with reference to FIG. 1 in order to clarify the invention.

Figure 1:
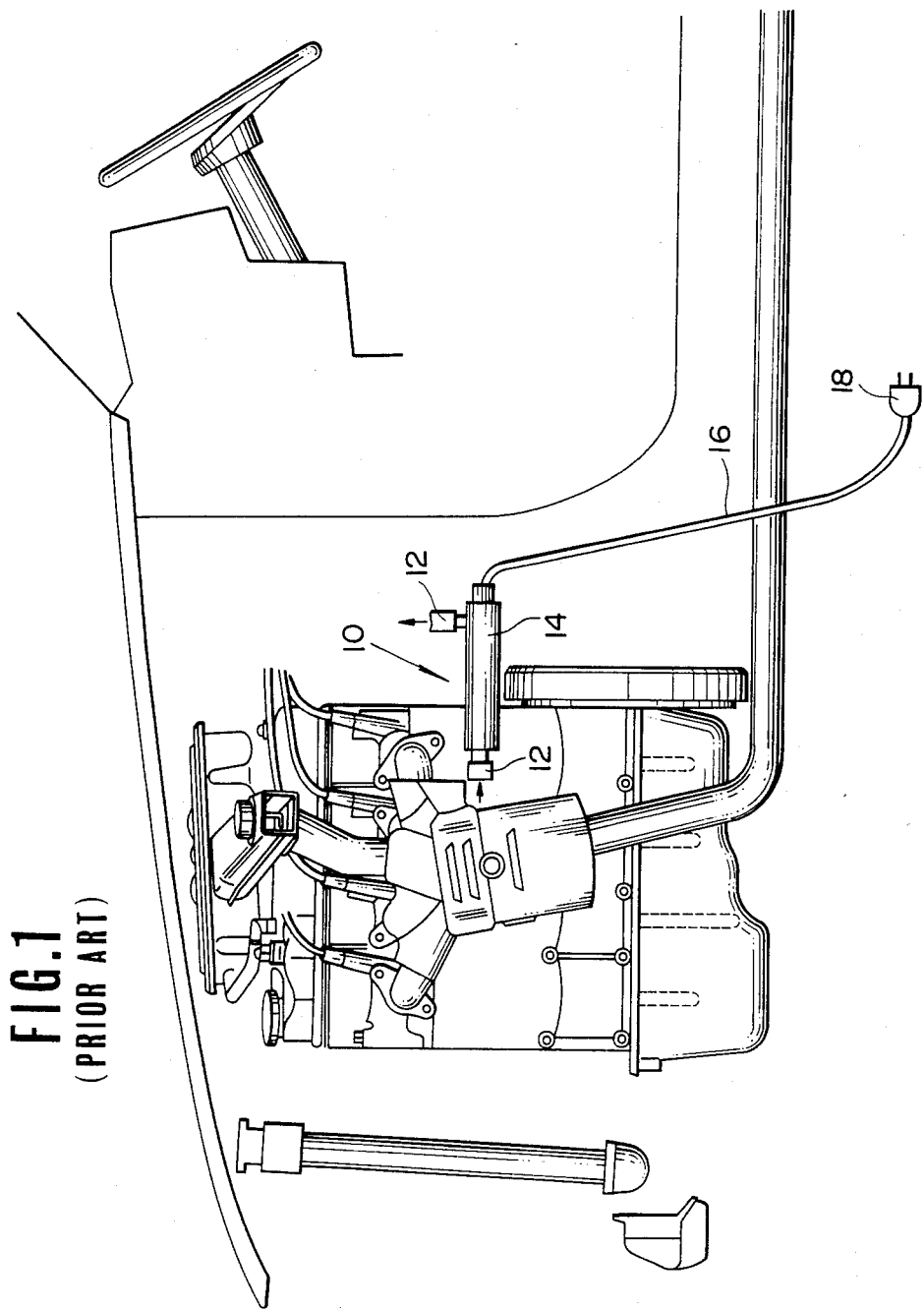
FIG. 1 is a view of a conventional cold-start boosting device mounted in an automotive internal combustion engine.

In FIG. 1, one conventional boosting device 10 is shown as being incorporated with an automotive internal combustion engine. The device 10 comprises a conduit pipe 12 connected to the water jacket of the engine and thus filled with the engine cooling water. A unit 14 including an electric water pump and an electric heater is mounted to the conduit pipe 12, so that upon electric energization of the unit 14, the cooling water flows in the conduit pipe 12 in the direction of the arrows and the water is warmed. The unit 14 has an extension cord 16 extending therefrom. The cord has a plug 18 at its leading end. In use of the boosting device, the plug 18 is inserted into an output (not shown) of a household electric wiring for energization of the unit 14.

When achieving easy start of the engine under a cold condition, the cold-start boosting device is kept running, while the engine is out of operation, to keep the temperature of the cooling water and thus that of the engine proper at a considerably high degree. With this, atomization of fuel and lubrication of pistons are rightly effected during the cold-start, so that the engine start is easily achieved even when the surrounding of the engine is very cold. However, due to its inherent construction, the conventional boosting device 10 as stated hereinabove has the following drawbacks:

(1) The practical usage of the boosting device is restricted to only the place where the associated motor vehicle is parked.

(2) Since continuous energization of the unit 14 is necessary especially when the engine is out of operation for all night long, electricity is consumed wastefully.

DETAILED DESCRIPTION OF THE INVENTION

Figure 2:
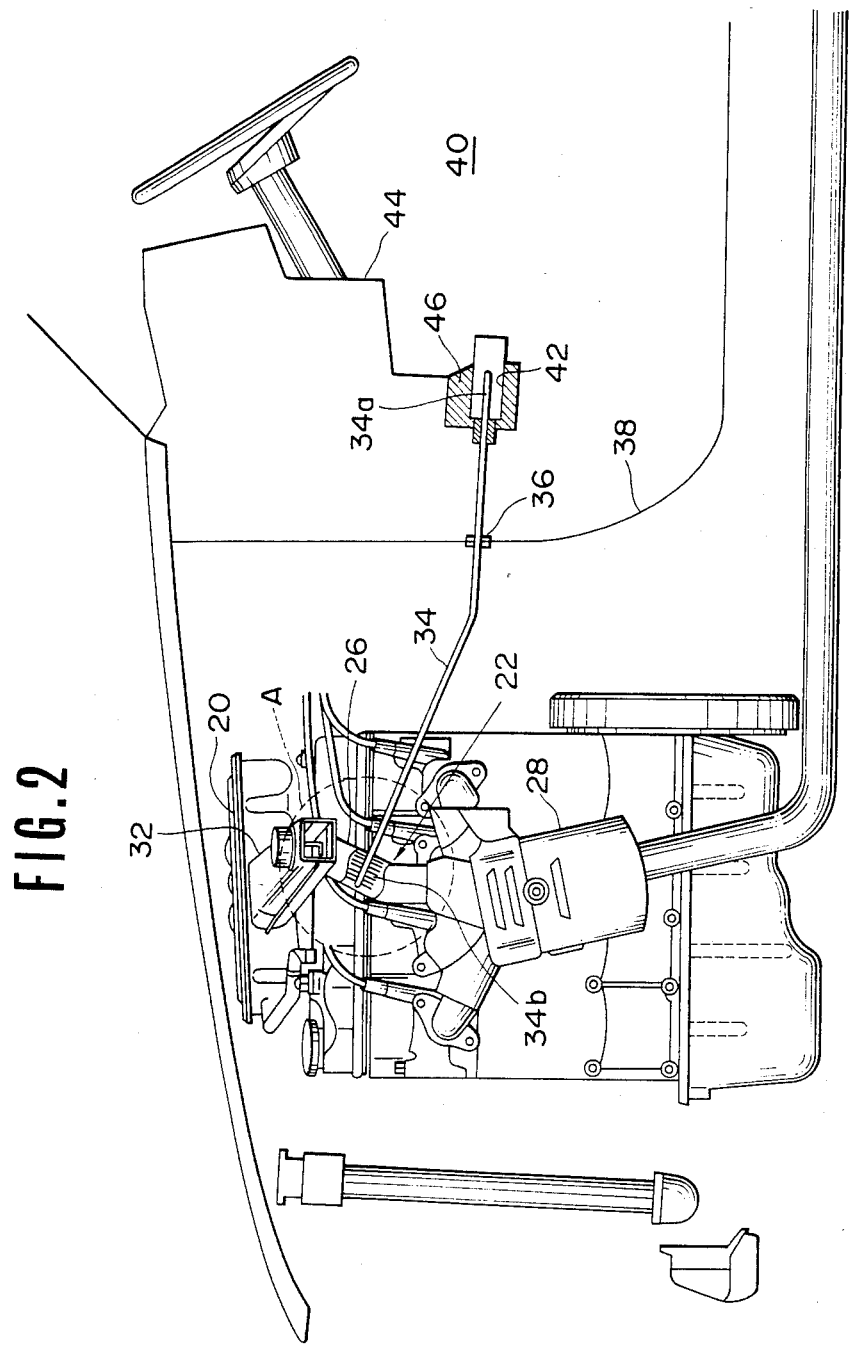
FIG. 2 is a view similar to FIG. 1, but showing an improved cold-start boosting device according to the present invention.
Figure 3:
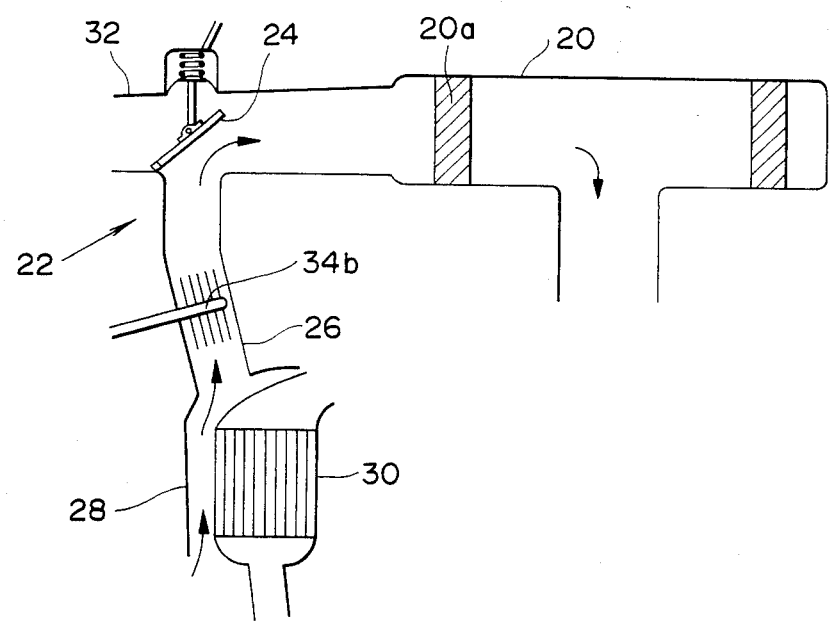
FIG. 3 is a sectional view of the portion enclosed by a circle "A" of FIG. 2, showing a hot-air induction section of the air cleaner with which an essential part of the cold-start boosting device of the invention is incorporated.

Referring to FIG. 2, there is shown a cold-start boosting device according to the present invention, which is incorporated with an automotive internal combustion engine. The engine shown has an air cleaner 20 equipped with a known "hot air induction device 22". As is seen from FIG. 3, the hot-air induction device or intake system 22 is so constructed that when the temperature of the ambient air is lower than a predetermined low level, a damper door 24 opens the opening from the hot-air induction passage 26. The passage 26 leads to the interior of a cover 28 which spacedly covers a heated member of the exhaust system, such as a catalitic converter 30 shown in the drawing. Thus, with the damper door 24 being kept open, air warmed by the heated catalytic converter 30 flows in the direction of the arrows and is fed to the engine proper through an air inlet tube and air cleaner element 20a. When the temperature of the ambient air becomes higher than the predetermined level, the relative degree of opening of the two openings is varied by moving the damper door 24 to close the opening from the hot-air induction passage 26 and increase the opening from the ambient air induction passage 32 thereby to supply the engine proper with the ambient air (non-heated air).

The cold-start boosting device of the present invention is incorporated with the above-mentioned hot-air induction device 22 in the manner described hereinbelow. The boosting device comprises a heat pipe 34 having a heat absorbing end portion 34a and a heat emitting end portion 34b. The heat pipe 34 passes through a hole 36 formed in a dashboard 38 having the heat absorbing end portion 34a exposed to the passenger compartment 40, and the heat emitting end portion 34b exposed to the interior of the aforementioned hot-air induction passage 26. The heat emitting end portion 34b is provided with a plurality of fins (no numerals) for improved heat emitting efficiency thereof. The heat absorbing end portion 34a is spacedly received in a receptable 42 which is formed in a suitable portion of the instrument panel 44. The receptacle 42 is mantled with a heat insulating material 46 except the mouth portion thereof. The heat pipe 34 may take any construction as long as it has such a function that by cyclically repeating evaporation of the working fluid (for example, water) contained therein and condensation of the same, the heat transmission is effected from the heat absorbing end portion 34a to the heat emitting end portion 34b with a thermal conductivity higher than that of the material of the pipe proper.

Referring to FIG. 4 of the drawings, there is shown an example of a thermal storage device 47 usable in the present invention. As will become apparent as the description proceeds, the device 47 is of a portable type and is neatly received in the receptacle 42 when the cold-start boosting is required. The device 47 comprises a double-walled cylindrical container 48 for containing therein a heat storage material. The inner cylindrical member 48a of the container 48 acts as a receptacle into which the afore-mentioned heat absorbing end portion 34a of the heat pipe 34 is intimately received. Within the container 48, more particularly, within the tubular space defined between the inner and outer cylindrical members 48a and 48b, is contained a heat storage material 50 such as a mixture of LiOH and NaOH. A plurality of fins 52 are mounted about and welded to the outer cylindrical surface of the inner member 48a of the container 48. An electric heater wire 54 (for example, nichrome wire) is wound round the outer cylindrical member 48b of the container 48 with an interposal of a thin insulating sheet (no numeral) therebetween. The container 48 thus furnished in the above-stated manner is housed in a casing 56 and fixed in position by a supporter 58 of ceramic or the like. The casing 56 is so shaped and sized to be neatly received in the afore-mentioned receptacle 42 formed in the instrument panel 44. The casing 56 and the supporter 58 have respective circular openings (no numeral) which are coaxial with the tubular bore of the inner cylindrical member 48a of the container 48. A heat insulating material 60, such as a rock wool or the like, is packed in the tubular space defined between the container 48 and the casing 56.

One terminal end 54a of the electric heater wire 54 is connected through a lead wire 62 to one of electrodes 64 which are mounted in the casing 56 through an insulating mounting member (no numeral), while, the other terminal end 54b of the heater wire 54 is connected through a lead wire 66 to a movable contact 68 of a thermostat 70. The movable contact 68 is actuated or moved by a bimetal bar 72 which has one end exposed to the heat storage material 50 in the container 48. The movable contact 68 is selectively contactable to a normally closed stationary contact 74 and a normally open stationary contact 76. The stationary contact 74 is connected through a lead wire 78 to the other of the electrodes 64, while, the other stationary contact 76 is connected to a circuit of a pilot lamp 80. Denoted by numeral 82 is a cord connector which is detachably connected to the outward projected portions of the electrodes 64. The connector 76 has an extension cord 84 extending therefrom. A plug 86 is fixed to the leading end of the cord 84.

In the following, operation will be described.

As is known, in a cold season, it is difficult to start the engine because of insufficient cranking speed caused by a power drop of the battery. In fact, the insufficient cranking of the engine causes the temperature of the compressed air-fuel mixture in the combustion chambers to fail to rise to a sufficient level for achieving a desired ignition of the mixture. In such a case, the cold-start boosting device of the invention is practically used in the following manner.

Before starting the engine, the thermal storage device 47 is charged for a while by inserting the plug 86 into the output (not shown) of the household electric wiring. It is to be noted that as the device 47 is of a portable type, the charging of it can be carried out at any place so long as the place is equipped with the electric output. In other words, the charging of the device 47 can be achieved at a place far from the place where the associated motor vehicle is parked. By inserting the plug 86 into the household electric output, the electric heater wire 54 is energized to generate heat and thus heat the heat storage material 50 (LiOH+NaOH) in the device 47. When the temperature of the heat storage material 50 comes to a predetermined level (that is, the temperature at which the mixture 50 is fused), the movable contact 68 of the thermostat 70 is shifted from the normally closed stationary contact 74 to the normally open stationary contact 76 because of the function of the bimetal 72, causing deenergization of the electric heater wire 54 and lighting of the pilot lamp 80. By the function of the thermostat 70, holding the plug 86 in the electric output causes repetition of energization and deenergization of the heater wire 54 and the pilot lamp 80.

When the thermal storage device 47 is sufficiently heat-charged in the afore-mentioned manner, it is carried into the vehicle cabin 40 with the extension cord 84 detached therefrom and it is put in the receptacle 42 of the instrument panel 44, having the heat absorbing end portion 34a of the heat pipe 34 intimately received in the cylindrical bore 48a of the heat storage material container 48. With. this, the heat accumulated in the container 48 is transmitted to the heat absorbing end portion 34a of the heat pipe 34 and transmitted through the body of the same to the heat emitting end portion 34b which is exposed to the interior of the hot-air induction passage 26 of the air cleaner 20. Thus, upon cranking of the engine, the air flowing in the passage 26 is warmed by heat emitted from the heat emitting end portion 34b of the heat pipe 34 and is fed into the engine proper. Feeding the engine with such hot air at cranking permits the temperature of the compressed air-fuel mixture in the combustion chambers to rise quickly to a sufficient level for properly igniting the mixture. Thus, the engine start is achieved easily even in a cold condition.

As is understood from the above description, in accordance with the present invention, the following advantages are provided in comparison with the conventional device:

(1) Since the thermal storage device 47 employed in the present invention is of a portable type, the charging of it can be achieved at any place so long as the place is equipped with the output of the electric wiring. In other words, unlike the case of the conventional device, the charging of the thermal storage device can be made at a place far from the place where the associated motor vehicle is parked.

(2) Since the charging of the thermal storage device is necessitated at only the time of engine starting, comsumption of electricity is small as compared with the case of the conventional device.

What is claimed is:

1. In a hot air intake system of an internal combustion engine having an air inlet tube through which air to be fed to the engine proper passes and an exhaust member through which hot combusted gas from the engine proper passes before discharging to the open air, said air inlet tube having a first opening for ambient air and a second opening for hot air, a hot air passage for transmitting heated air from said exhaust member to the second opening, and means for varying the opening degree of the first opening relative to that of the second opening in accordance with the temperature of the ambient air, the improvement comprising:
- a heat pipe having a heat absorbing end and a heat emitting end mounted in a position exposed to the air flowing through the interior of said hot air passage; and
- a portable thermal storage device detachably connectable in heat exchange relationship to said heat absorbing end of the heat pipe and providing a source of heat accumulated in the thermal storage device to heat the air in said hot air passage through the heat pipe.

2. The improvement as claimed in claim 1, in which said heat emitting end of the heat pipe is formed with a plurality of fins for improved heat transmittance therefrom to the air flowing in the hot air passage.

3. The improvement as claimed in claim 2, in which said hot air passage is a hot-air induction passage connected to the air cleaner of the engine and conveying air warmed by the exhaust member of the engine to the engine proper when the temperature of the ambient air is lower than a certain level.

4. The improvement as claimed in claim 1, in which said heat absorbing end of the heat pipe is received in a receptacle formed in an instrument panel of a vehicle having the engine.

5. The improvement as claimed in claim 4, in which said receptacle has a mouth portion for receiving said portable thermal storage device, and is surrounded with a heat insulating material except the mouth portion thereof.

6. The improvement as claimed in claim 5, in which said receptacle is so shaped and sized to intimately receive therein said portable thermal storage device.

7. The improvement as claimed in claim 1, in which said portable thermal storage device comprises:
- a double-walled cylindrical container including concentrically arranged inner and outer cylindrical members between which a first tubular space is defined;
- a heat storage material disposed in said first tubular space;
- a plurality of fins mounted around and welded to the outer cylindrical surface of said inner cylindrical member;
- an electric heater wire wound around the container with an insulating member interposed therebetween;
- a casing forming a housing for said container and defining a second tubular space therebetween;
- a heat insulating material packed in the second tubular space;
- means for fixing said container in said casing; and
- a thermostat exposed to said heat storage material and connected to supply current to the electric heater wire when the temperature of the heat storage material is lower than a predetermined level.

8. The improvement as claimed in claim 7, in which said inner cylindrical member of the container comprises a receptacle for receiving the heat absorbing end of the heat pipe.

9. The improvement as claimed in claim 8, in which said portable thermal storage device further comprises an extension cord, said cord having at one end a connector detachably connected to a terminal of said thermostat and at the other end a plug for connection to a power source.

10. The improvement as claimed in claim 7, in which said heat storage material comprises a mixture of LiOH and NaOH.

11. The improvement as claimed in claim 7, in which said portable thermal storage device further comprises a pilot lamp mounted to said casing, said pilot lamp being electrically energized to light when the temperature of said heat storage material comes to a predetermined level.

* * * * *